United States Patent
Petrement et al.

(10) Patent No.: US 11,621,659 B2
(45) Date of Patent: Apr. 4, 2023

(54) METHOD FOR CONTROLLING A POLYPHASE MOTOR

(71) Applicant: MOVING MAGNET TECHNOLOGIES, Besançon (FR)

(72) Inventors: Geoffroy Petrement, Besancon (FR); Guillaume Callerant, Chavannes-sur-l'Etang (FR)

(73) Assignee: Moving Magnet Technologies, Besancon (FR)

( * ) Notice: Subject to any disclaimer, the term of this patent is extended or adjusted under 35 U.S.C. 154(b) by 182 days.

(21) Appl. No.: 17/043,297

(22) PCT Filed: Apr. 9, 2019

(86) PCT No.: PCT/FR2019/050832
§ 371 (c)(1),
(2) Date: Sep. 29, 2020

(87) PCT Pub. No.: WO2019/197775
PCT Pub. Date: Oct. 17, 2019

(65) Prior Publication Data
US 2021/0021216 A1  Jan. 21, 2021

(30) Foreign Application Priority Data

Apr. 9, 2018 (FR) ...................................... 1853070

(51) Int. Cl.
*H02K 41/00* (2006.01)
*H02P 8/00* (2006.01)
*H02P 8/16* (2006.01)

(52) U.S. Cl.
CPC ................ *H02P 8/005* (2013.01); *H02P 8/16* (2013.01)

(58) Field of Classification Search
CPC ................................... H02P 8/005; H02P 8/16
See application file for complete search history.

(56) References Cited

U.S. PATENT DOCUMENTS

| 4,501,981 A | 2/1985 | Hansen |
| 5,029,264 A | 7/1991 | Ito et al. |

(Continued)

FOREIGN PATENT DOCUMENTS

| JP | 2004-064932 A | 2/2002 |
| JP | 2007-259536 A | 10/2007 |
| JP | 2013-018449 A | 1/2013 |

OTHER PUBLICATIONS

Lekien Minh et al., "An Advanced Closed-Look Control to Improve the Performance of Hybrid Stepper Motors," IEEE Transactions on Power Electronics Performance, vol. 32, No. 9, Sep. 1, 2017.

*Primary Examiner* — Karen Masih
(74) *Attorney, Agent, or Firm* — Harness Dickey & Pierce, PLC (57) ABSTRACT

A method for controlling a polyphase actuator includes supplying each phase with a periodically varying voltage having a periodic sequence of steps $P_i$ that have a constant duration and an amplitude $A_{n,i}$, where n corresponds to the rank of the phase and i to the rank of the step. The method further includes determining a target position $PC_i$ of a rotor of the actuator, in order to define a sinusoidal voltage envelope. The actuator further includes a movable member, a stator equipped with electrical coils and a sensor detecting the mechanical position of the movable member with respect to the stator, as well as a microcontroller. The microcontroller determines, at times $T_{capteur}$, a mechanical position of a mechanical member, the microcontroller calculates, at each of the times $T_{capteur}$, a difference between the mechanical position and a target position $PC_i$ corresponding to the step $P_i$ and the microcontroller calculates a coefficient k as a function of the difference. The microcontroller also weights the amplitude of a power supply applied to the phases by a coefficient k in order to supply the phases with weighted amplitude voltages $A_{n,i}*k$.

14 Claims, 11 Drawing Sheets

(56) References Cited

U.S. PATENT DOCUMENTS

| | | | |
|---|---|---|---|
| 5,136,194 | A | 8/1992 | Oudet et al. |
| 5,528,139 | A | 6/1996 | Oudet et al. |
| 5,663,624 | A * | 9/1997 | Callaway ................ H02P 8/14 |
| | | | 347/37 |
| 5,903,117 | A | 5/1999 | Gregory |
| 6,043,645 | A | 3/2000 | Oudet et al. |
| 6,236,125 | B1 | 5/2001 | Oudet et al. |
| 6,563,412 | B2 | 5/2003 | Paris |
| 6,786,465 | B1 | 9/2004 | Beswick |
| 7,114,465 | B1 | 10/2006 | Beswick |
| 7,121,240 | B2 | 10/2006 | Tani |
| 7,304,450 | B2 * | 12/2007 | Prudham ................ H02K 29/08 |
| | | | 318/700 |
| 7,589,445 | B2 | 9/2009 | Grandel |
| 8,810,187 | B2 | 8/2014 | Vu |
| 9,684,285 | B2 | 6/2017 | Rondot |
| 10,122,311 | B2 * | 11/2018 | Andrieux ................ H02K 7/06 |
| 2002/0167384 | A1 | 11/2002 | Paris |
| 2005/0076867 | A1 * | 4/2005 | Tani ........................ F01L 1/022 |
| | | | 123/90.17 |
| 2005/0189508 | A1 | 9/2005 | Beswick |
| 2005/0218727 | A1 * | 10/2005 | Gandel ................ H02K 29/08 |
| | | | 310/80 |
| 2008/0100249 | A1 | 5/2008 | Coutu |
| 2012/0285411 | A1 | 11/2012 | Nowak et al. |
| 2013/0043822 | A1 * | 2/2013 | Vu ............................ H02P 8/38 |
| | | | 318/696 |
| 2014/0203669 | A1 | 7/2014 | Rios Quesada |
| 2015/0048694 | A1 | 2/2015 | Rios-Quesada |
| 2015/0159770 | A1 | 6/2015 | Fouoaut et al. |
| 2015/0323908 | A1 | 11/2015 | Rondot |
| 2017/0194885 | A1 * | 7/2017 | Ron ........................ H02P 6/085 |

\* cited by examiner

METHOD FOR CONTROLLING A POLYPHASE MOTOR

CROSS-REFERENCE TO RELATED APPLICATIONS

This application is a National Phase Entry of International Patent Application No. PCT/FR2019/050832, filed on Apr. 9, 2019, which claims priority to French Patent Application No. 18/53070, filed on Apr. 8, 2018, both of which are incorporated by reference herein.

TECHNICAL FIELD

The present invention relates to the field of polyphase brushless actuators that are controlled in step-by-step mode by a microcontroller. The invention relates to both rotary actuators and linear actuators. In a non-limiting manner, the present invention relates to the field of actuators for fluid control, which fluid may or may not be a refrigerant. Such actuators generally comprise a rotor provided with permanent magnets, which rotor is moved by the magnetic field created by a set of coils controlled by power electronics. Whether or not each coil is powered defines a relative position of the rotor with respect to the stator.

Full-step stepper motors have a limited number of discrete positions (usually as many positions as there are magnetic poles on the stator), but proportionally controlled stepper motors can increase precision. The term "microsteps" is thus used since the motor has a plurality of equilibrium positions between two steps. In the present patent, the term "step" will designate interchangeably a full step or a "microstep."

BACKGROUND

United States Patent Publication No. 2013/043822 is known in the prior art and describes a solution for controlling a stepper motor using a position-feedback device having a resolution capacity of 200 steps per turn of the motor shaft, for step offset detection and motor step recovery. The position deviation is calculated periodically and cyclically, subtracting the return position from the corresponding commanded position, in order to implicitly determine the load angle and the operating state of the motor, the load angle being defined as the angle between the maximum of the magnetomotive force and the direct axis (commonly called the "d axis") of the rotor, that is to say the angular difference between the magnetic field vector created by the wound stator of the motor and the magnetic field vector of the rotor. If the load angle is within a set allowable value range, normal operation of the stepper motor along the programmed trajectory is maintained without adjustment. A load angle that exceeds the limits of this range, however, indicates that a misstep has occurred, and the system controller initiates an action to recover the lost motor steps, in order to reestablish synchronism.

United States Patent Publication No. 2008/100249 describes another example of controlling the rotation of a stepper motor, comprising the steps of:
 determining the rotational position of a stator field with respect to a rotor within a stepper motor continuously during the rotation of said motor; and
 delaying the rotation of said stator field when a first predetermined amount is exceeded and said rotor lags said stator field for optimum performance of said motor.

U.S. Pat. No. 5,029,264 describes an application of a stepper motor for moving a carriage;
 detecting means for detecting an angular position of the rotor of said stepper motor, the detecting means generating a pulse signal for each predetermined angle of rotation of said rotor;
 control means for counting the pulse signals from said detecting means, detecting a position of said carriage according to the pulse signals counted by said control means, delivering control signals for starting and stopping said carriage, and delivering an initialization signal;
 current switching means for counting the pulse signals from said detecting means and changing an excitation current supplied to the coil of said stepper motor according to the pulse signals counted by said current changing means in order to perform closed-loop control, current switching means also performing steppermotor drive of said stepper motor in response to the initialization signal from said control means, said current changing means bringing said rotor into a stable position and returning the counted value to a reference value, starting the excitation-current change control in response to the start control signal from said control means and stopping the excitation-current change control in response to the stop command from said control means.

Japanese Patent Application No. 2007-259568 discloses a stepper-motor drive device having a microstep function in which a sinusoidal current flows through a motor winding whenever an external drive pulse is applied and a base step angle is segmented. The drive device comprises: an angle detector for detecting the angle of rotation of a rotor; a motion controller which calculates an excitation angle from an external control pulse and an angle of rotation of the rotor; an inverter for driving a stepper motor; a current controller for controlling the current of the stepper motor; a current detector for detecting a motor current; and a current command generator for generating current amplitude commands. The driving device is formed such that an angle command is corrected using information about a change in the output of the angle detector obtained when two different current commands are generated by the current command generator when the motor is stopped.

The solutions of the prior art result in relatively high current consumptions in certain situations, in particular when the actuator has reached a stop and leads to the level of electrical energy necessary to control the position being exceeded. The solutions of the prior art do not dynamically and continuously adjust the current supplied to the stator part in order to minimize said current as a function of the instantaneous load applied to the rotor. This non-adjustment according to the load implies greater energy consumption and self-heating by the Joule effect of the stator coils, penalizing the performance of said motor.

U.S. Pat. No. 8,810,187 B2 proposes periodically monitoring the movement of the rotor in order to verify that the control steps are adhered to, but does not provide any continuous monitoring of the load angle. Moreover, it does not dynamically modify the amplitude of the current injected in each step. United States Patent Publication No. 2008/100249 corrects the speed of movement and not the current.

U.S. Pat. No. 5,029,264 relates to BLDC control of the stepping motor requiring a PID controller that needs numerous calculations and is able to generate set point overruns. Japanese Patent No. 2007-259568 proposes measuring the position of the rotor in order to modify the step control phase but without modifying the amplitude of the current.

SUMMARY

The invention relates to a method for controlling a polyphase actuator involving supplying each phase with a periodically varying voltage having a periodic sequence of steps $P_i$ that have a constant duration and amplitude $A_{n,i}$, where n corresponds to the rank of the phase (for example, a triphase motor has 3 phase ranks) and i to the rank of the step (for example, a 48-step control per electric period has 48 ranks) determining a target position $PC_i$ of the rotor of the actuator, in order to define a sinusoidal voltage envelope, said actuator further comprising a movable member, a stator equipped with electrical coils and a sensor detecting the mechanical position of said movable member with respect to said stator, as well as a microcontroller, characterized in that:

said microcontroller determines, at times $T_{capteur}$, the mechanical position of said mechanical member;

said microcontroller calculates, at each of said times $T_{capteur}$, the difference between said mechanical position and the target position $PC_i$ corresponding to the step $P_i$ and said microcontroller calculates a coefficient k as a function of said difference;

said microcontroller weights the amplitude of the power supply applied to said phases by the coefficient k in order to supply said phases with weighted amplitude voltages $A_{n,i}*k$ ($A_{n,i}$ multiplied by k).

In the present invention, it is considered that each phase of the motor is supplied with voltage according to a pulse width modulation (PWM). The coefficient k in question is a coefficient which modifies the duty cycle and therefore the average level of voltage applied to each phase.

The advantages of the solution presented here compared with the prior art are the dynamic range of the control, adjusting at each time $T_{capteur}$ to the real position of the moving member, and its ability to operate even at zero or reduced speed, the principle being independent of this speed.

According to a preferred embodiment, the method comprises at least one acquisition time $T_{capteur}$ of the mechanical position of said mechanical member for a step $P_i$, more preferably at least four acquisition times $T_{capteur}$. Said coefficient k can be proportional to the difference between said mechanical position and the target position $PC_i$ corresponding to the step $P_i$, but any other mathematical function can be used. The invention will preferably be used for a movable member which is the rotor of the actuator, in order to avoid being hindered by the errors induced by mechanical clearances, but said movable member can also be moved by the rotor via a movement conversion member.

In one embodiment, said rotor is movable through a plurality of turns. The movement is helical and the rank of the turn, relative to an initial position, is determined by the norm of the signal delivered by the two-dimensional magnetic sensor. In this case, the rank of the turn is compared with a previously recorded value.

In another embodiment, the method comprises a calibration step involving controlling the movement of the movable member as far as a mechanical stop, and detecting the locking by said coefficient k reaching a threshold value $k_{seuil}$, and recording, in a memory, the step $P_i$ corresponding to this threshold value being reached as a reference $P_0$ of said movable member. In another embodiment, the method comprises a step of holding the movable member in an inoperative position, involving periodically measuring the coefficient k, and controlling the amplitude of the supply voltage of said phases if said coefficient k exceeds a threshold value. Advantageously, the electrical phase control is modified to move the measured position of the rotor closer to the desired mechanical position. The invention described will be particularly advantageous for controlling a fluid control valve.

BRIEF DESCRIPTION OF THE DRAWINGS

The present invention will be better understood on reading the following detailed description of a non-limiting example of the invention, with reference to the appended drawings, in which.

DETAILED DESCRIPTION

Figure 1:
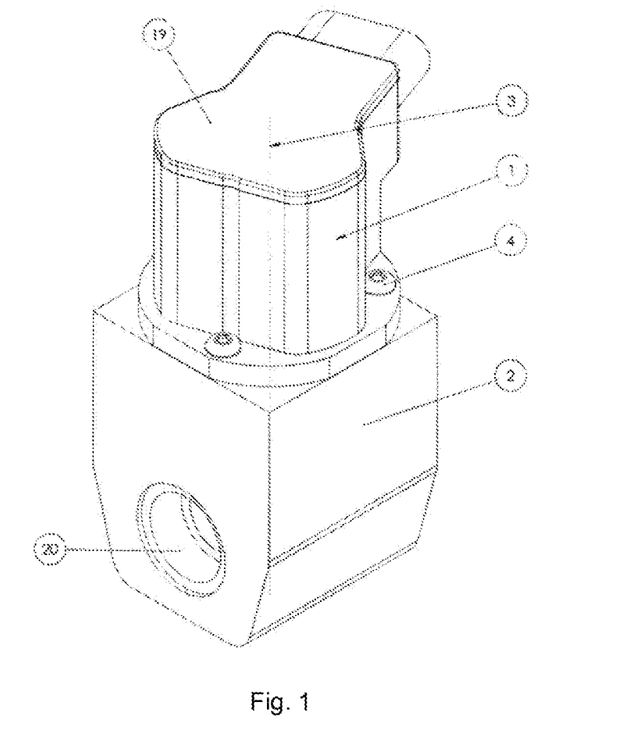
FIG. 1 is an isometric view of a control valve, which is given by way of example and can use the present control method.

FIG. 1 is an isometric view of a first embodiment of a valve according to the invention, combining an electrical actuation assembly and a mechanical assembly so as to create a flow path for a heat transfer fluid. The valve is thus more particularly composed of an electric actuator (1) which translates, along the movement axis (3), a needle (not visible here) using an electric motor. The actuator (1) is secured to the valve body (2), which includes the through-channels (20) of a heat transfer fluid, the flow rate of which is controlled by said needle. The electric actuator (1) includes a cover (19) on the upper part, and is secured to the valve body (2) by axial securing means (4), such as screws or bolts.

Figure 2:
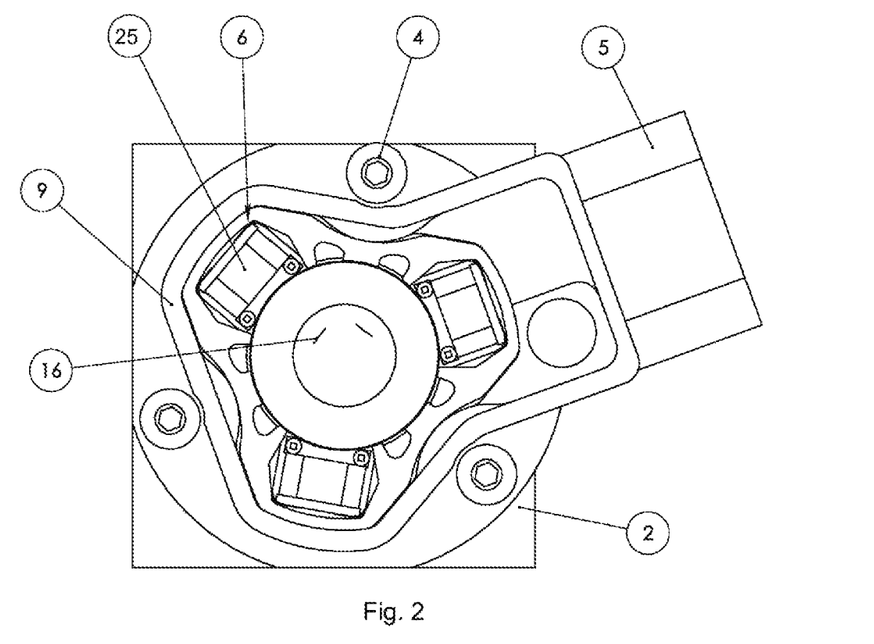
FIG. 2 is a cross-sectional view of the control valve shown in FIG. 1.

FIG. 2 is a top view of the first embodiment without a cover, which makes it possible to see the radial-magnetic-flux electric actuator that can be used in the present invention. Any other electric actuator that generates a torque in terms of movement conversion can be used, for example an electric actuator using magnetic flux along the axis of movement. This actuator (1) has a stator (6) formed of a stack of sheets that form teeth, on some of which electric coils (25) are placed, in this case three coils, at 120° from one another. This stator (6) is housed in a housing (9) which may comprise a connector (5). In this view without a cover (19), the presence of a sealing cup (16) can also be seen, inside which the rotor of the actuator (1) is placed as well as the needle to be moved, these elements being immersed in the heat transfer fluid. The stator (6) are located outside this cup so as to be isolated from the heat transfer fluid.

Figure 3:
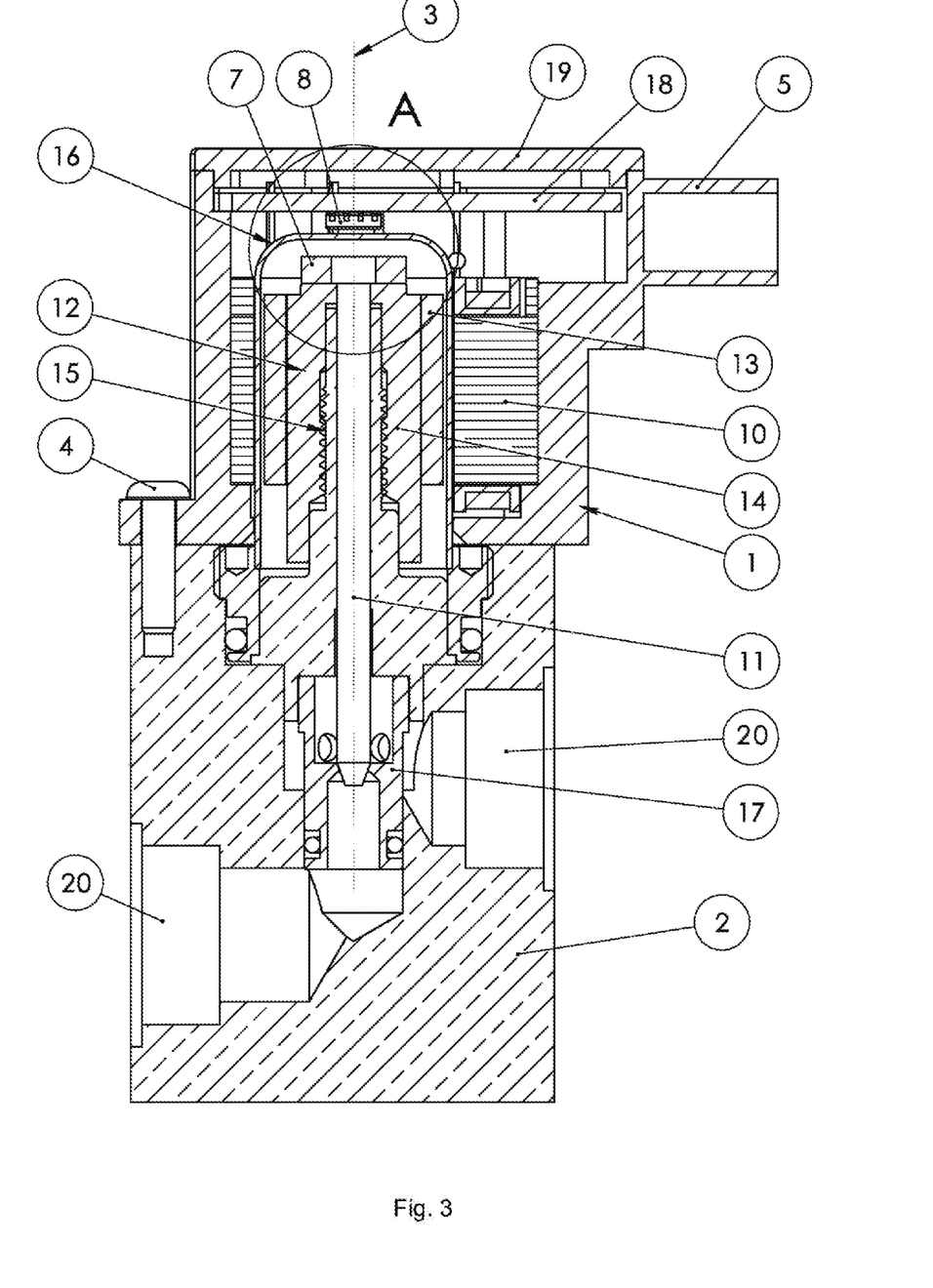
FIG. 3 is a longitudinal sectional view of the control valve shown in FIG. 1 with an enlarged isolated view.

FIG. 3 is a longitudinal section of a valve according to this first embodiment. The actuator (1) is screwed onto the valve body (2) using the securing elements (4). The valve body (2) has flow channels (20) for the inlet and outlet of heat transfer fluid. The passage of fluid is controlled by positioning the end of the needle (11), which is controlled by the electric actuator (1), along the axis (3), in order to bring this end of the needle (11) closer to or further away from the needle seat (17). The rotor (12) is composed of a nut part (14) which here too forms, in this particular embodiment, the yoke and the support of the permanent magnets (13), the rotor setting the needle (11) in motion by means of a connection, in this case a rigid connection, but the connection may be indirect via a spring at the interface (not shown). The movement of the rotor (12) and therefore of the needle (11) follows a helical path, thus combining a rotation, that of the electric machine formed by the rotor (12) and the stator (6), and a translation, necessary for screwing the nut part (14) on the screw (15), which is in this case fixed and rigidly connected to the valve body (2). The movement is helical but only the translation component is mechanically significant for controlling the valve, the needle having a revolution geometry. The design shown here is particularly compact axially and has a guide provided entirely in the active height of the sheet stack (10), this guide being in this case provided by the screw (15) in cooperation with the nut (14) and by the body of the needle (11) in cooperation with the inner surface of the fixed screw.

In this design of FIG. 3, a position sensor of the needle (11) is shown. This magnetic-principle sensor is located on the upper part of the valve, above the rotor (12). A magnetized magnetic element (7) is rigidly connected to the nut part (14), therefore to the rotor (12) and therefore to the needle (11). This magnet (7), which has a magnetization that is diametrical perpendicular to the axis of rotation of the rotor or bipolar along the axis of the rotor (3), or a rotating magnetization around an axis perpendicular to the axis (3), is also inserted inside the cup (16). This magnetic element generates a magnetic field in the plane of the probe (19) perpendicular to the axis (3). As the rotor (12) rotates, this magnetic field will rotate synchronously with the rotor (12). During a helical movement of the rotor (12), this magnetic element (7) therefore moves away or approaches the bottom of the cup (16). Facing the cup (16) and outside said cup (16), a magneto-sensitive probe (8) is positioned on the axis (3), which probe detects the angle of the magnetic field and, depending on the uses, the amplitude of the component of the magnetic field perpendicular to the axis (3) or the norm of the components perpendicular to the axis (3) that are emitted by the magnetic element (7). The distance or the approach of this magnetic element (7) relative to the magneto-sensitive probe (8) thus makes it possible to modulate the amplitude of the field detected by the probe (8) and to project the image of the position of the needle (11).

The probe (8) is supported by a printed circuit (18) located above the cup (16), under the cover (19). This printed circuit (18) can also support the connection points to the coils of the actuator (1) as well as the electronic components necessary for controlling the polyphase electric motor. The magnetic element (7) generating the axial magnetic field is in the form of a magnet, based on neodymium iron boron, ferrite or samarium cobalt. The latter material has the advantage of a small variation of its magnetic properties as a function of temperature, thus minimizing the sensor signal drift and minimizing the influence of temperature gradients between the fluid and the magnetic-field measuring probe.

This smaller magnetic variation as a function of temperature is useful when measuring the amplitude of the field in order to determine an axial position. The measurement of the angular position, carried out by comparing the amplitudes of two non-collinear magnetic components perpendicular to the axis (3), is not dependent on the amplitude of these components. The probe (8) is a probe which measures at least two components orthogonal to the magnetic field, and may be a three-dimensional probe.

Figure 4A:
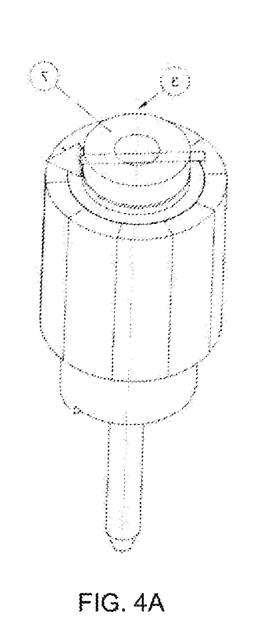
FIGS. 4a, 4b and 4c show examples of sensor-magnet magnetization variants used on rotors of an electric motor controlled by the present control method.
Figure 4B:
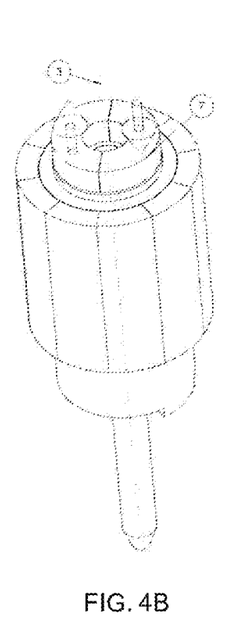
Figure 4C:
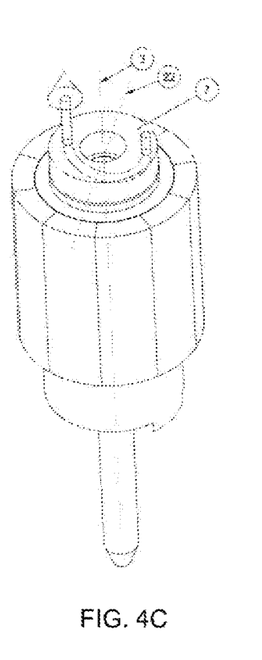

FIG. 4*a* shows a magnetized magnetic element (3) which generates the field necessary for the measuring probe and is magnetized diametrically, therefore so as to have a vector located in the plane perpendicular to the axis of rotation of the rotor (3). FIG. 4*b* shows a magnetized magnetic element (7) which generates the field necessary for the measuring probe and is magnetized in a bipolar manner, where two parts of said magnetic element are magnetized according to two vectors of opposite directions, which vectors are parallel to the axis of rotation of the rotor (3). FIG. 4*c* shows a magnetized magnetic element (7) which generates the field necessary for the measuring probe and is magnetized according to a rotating magnetization, the orientation of the magnetization inside said magnetic element rotating around an axis (22) perpendicular to the axis of rotation of the rotor (3).

Figure 5:
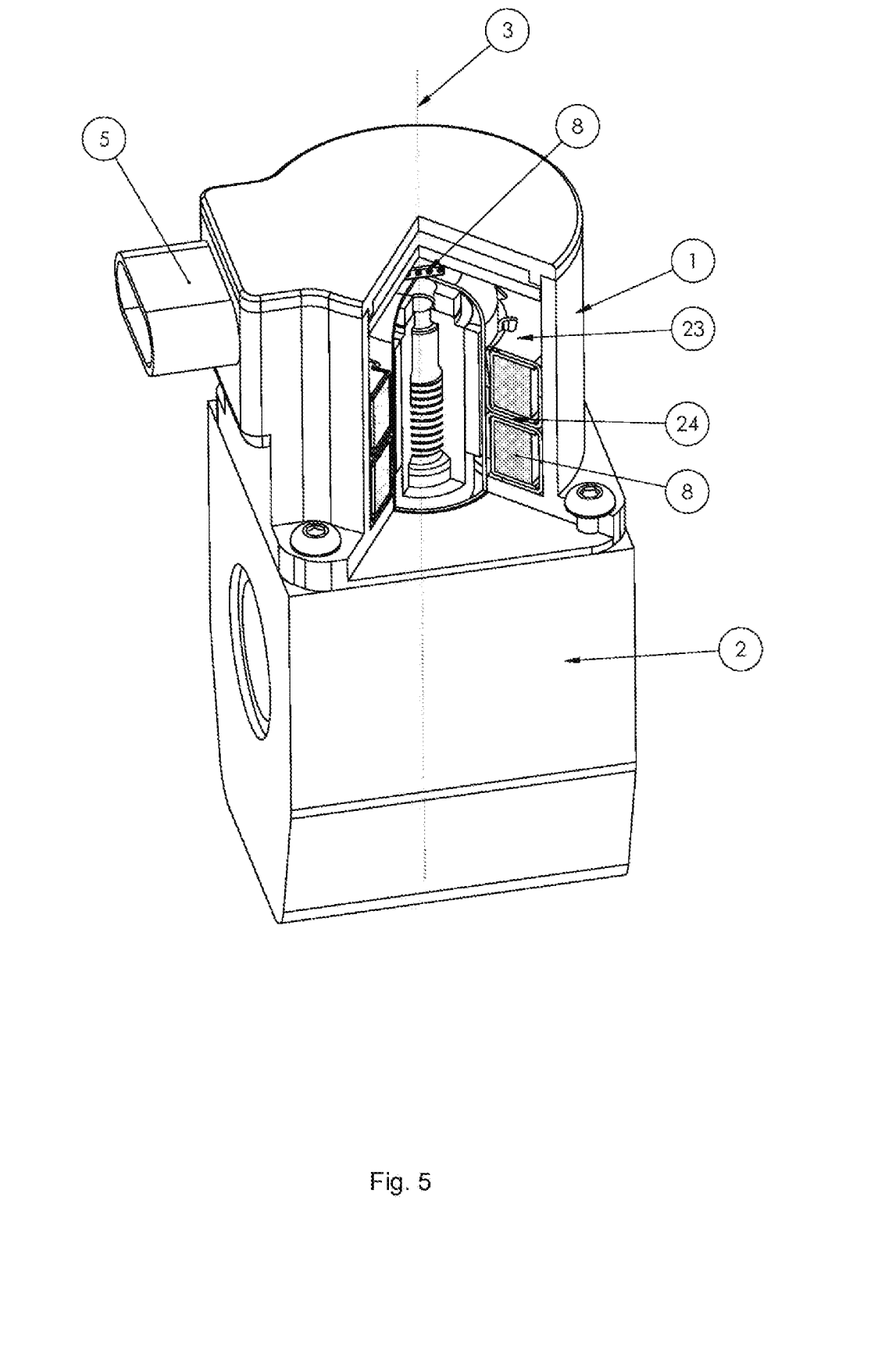
FIG. 5 is a partial longitudinal sectional view of a control valve, according to another example, which can use the present control method.
Figure 6:
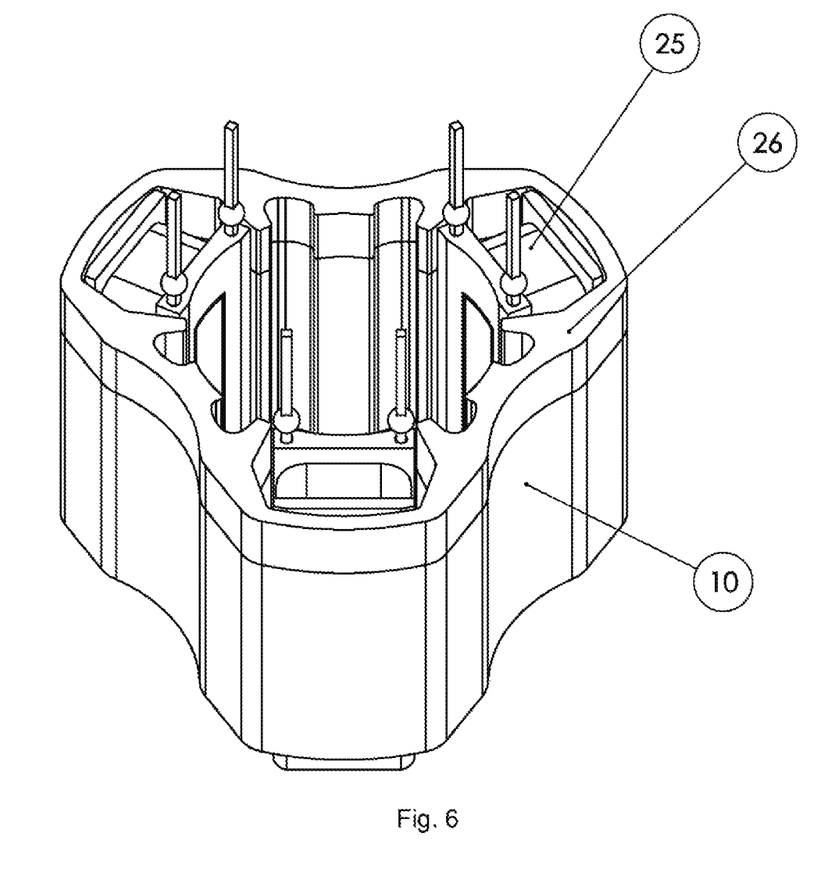
FIG. 6 is an isolated view of a stator belonging to a motor which can use the present control method.
Figure 7:
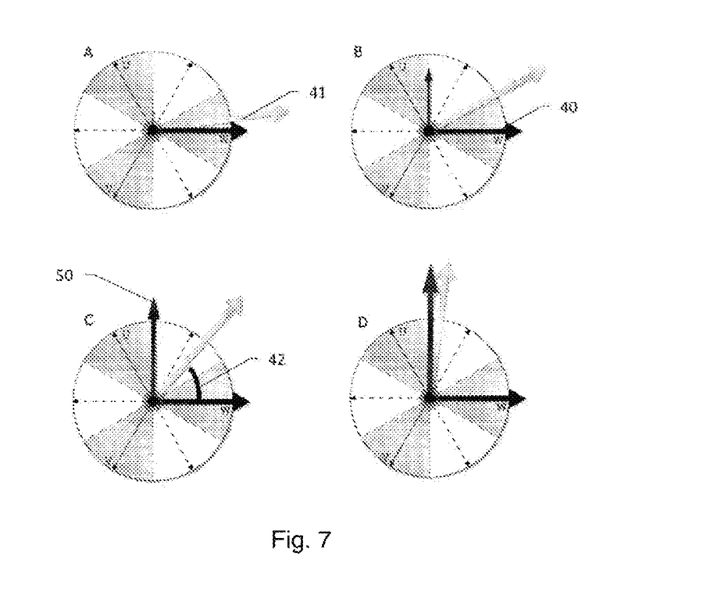
FIG. 7 is a schematic view of the load angle of a controlled motor which can use the present control method.

FIG. 5 shows an alternative to the construction of FIGS. 1, 2 and 3, where the radial flow electric motor is replaced by a claw-pole motor (23) comprising a set of cut and folded sheets (24) associated with the coils (25) so as to constitute the phases of said electric motor. The probe (8) soldered to the PCB (18) remains positioned close to the axis (3). FIG. 6 shows a solution for protecting the magnetic measuring probe against disturbing fields generated when an electric current passes through the stator coils (25). An additional stack of sheets (26) surrounds said coils in order to provide a preferred magnetic path to the fluxes generated by these coils.

FIGS. 7*a*, 7*b*, 7*c* and 7*d* are schematic views of the stator vector (40) and the rotor vector (41). In this figure, the vectors u, v, w are the orientations of the torques created by each of the phases of the motor taken separately. This is referred to as a "Fresnel diagram."

The stator vector (40) is the sum of the electrical microstep control signals at the terminals of the stator coils in the plane perpendicular to the axis (3). The rotor vector (41) is determined by analyzing the signals transmitted by the probe (8), which analysis is translated into the Fresnel diagram from the position signal from the position sensor, the knowledge of the number of pole pairs and a reference position.

The load angle corresponds to the angle between the stator magnetic field vector (40) and the rotor magnetic field vector (41). The resulting torque at the rotor generated by the electrical power supply at the stator varies from a zero torque (50), when this angle is equal to 0°, to a maximum torque, when the vectors are at 90°. The torque is directly proportional to the sine of the load angle and to the supply current. Under the assumption of a movement without any load at the rotor, the load angle is equal to 0° and the stator and rotor vectors are collinear. The actual angular position of the rotor is identical to the control position.

When applying a force to the rotor, for example by means of a braking torque, or a load or a driving torque, the load angle (42) increases and is then no longer equal to 0°. This is illustrated in the four figures, FIGS. 7a, 7b, 7c and 7d, in which the torque generated at the same supply current is increasing. When this load angle exceeds 90°, the torque exerted decreases and can cause a loss of synchronism between the rotor and the stator field, known as rotor stall.

Figure 8:
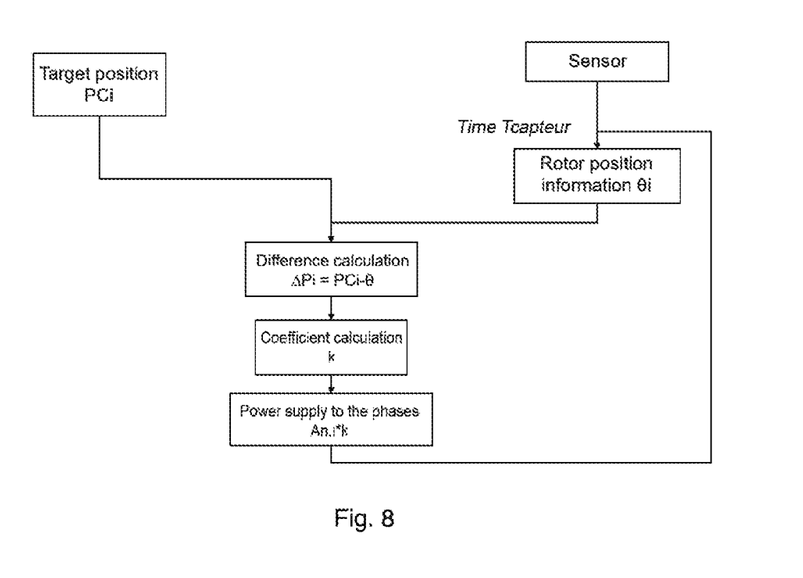
FIG. 8 shows a typical operating algorithm of the present control method.

The process using this load angle to control the motor is shown in FIG. 8. This offset is determined periodically, at least one or more times per microstep. If the load angle (42) is constant, the computer keeps the value of the coefficient k constant. If the load angle (42) increases or decreases, the computer modifies the value of the respectively higher or lower coefficient k in order to modify the control voltage (via a different duty cycle) and therefore the amplitude of the current injected into the phases. Preferably, the coefficient k is zero when the load angle is zero and is at a maximum when the load angle is 90°. The coefficient k may be a coefficient proportional to the load angle, but all other mathematical functions (quadratic or other) may be considered.

Figure 9:
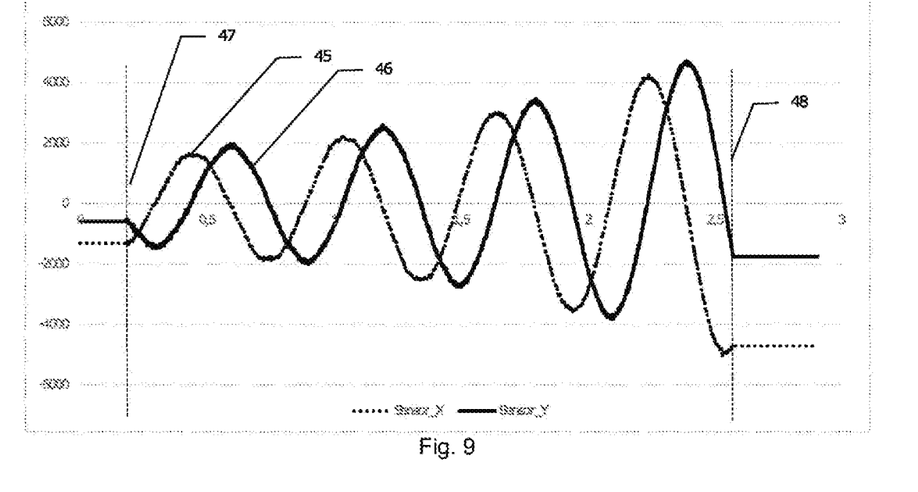
FIG. 9 shows a graph of magnetic induction detected by a magneto-sensitive probe associated with one of the sensor magnets of FIGS. 4a to 4c.
Figure 10:
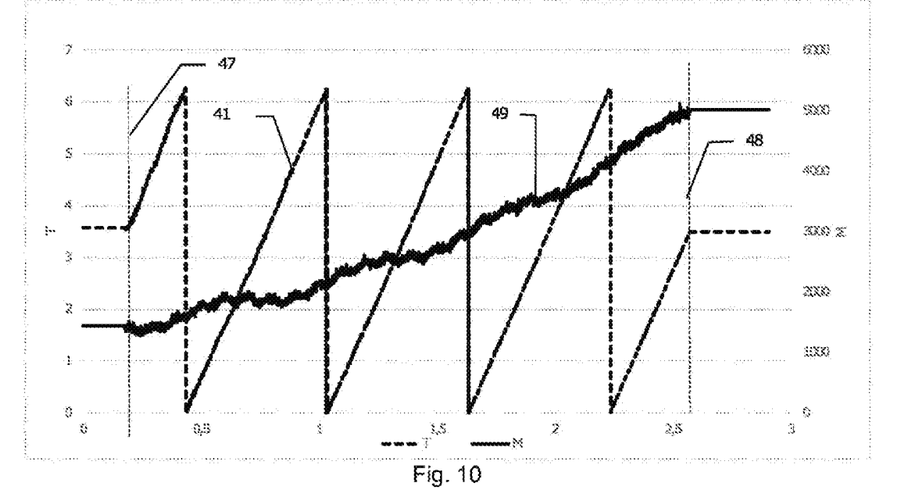
FIG. 10 shows the method implemented over a plurality of turns of the rotor of an actuator according to the invention.

FIG. 9 shows the different magnetic field components measured by the magnetic sensor, in this case the X component (45) and the Y component (46), along two orthogonal vectors located in a plane perpendicular to the axis of rotation (3) between a position (47) remote from the probe and a position (48) close to the probe, which positions are separated by approximately four turns in this non-limiting example. FIG. 10 illustrates the calculations made from the components of FIG. 9. The ratio of these two components (45) and (46) makes it possible to calculate the angle of the rotor magnetic field (41) by calculating the arctangent of this ratio. The signal (41) has four periods which correspond to the four rotational turns carried out by the rotor. The calculation of the norm of the measured field (49) makes it possible to estimate the distance of said magnet (7) with respect to the measuring probe (8). This distance is either measured directly using this magnetic field module, or interpolated. In the latter case, owing to the angular sensor, the position in a turn is known precisely, and the variations in amplitude of the field are sufficient to determine in which turn the rotor (12) is located. The axial position of the rotor along the screw can therefore be known very precisely by analyzing these two measurements of angle (41) and amplitude (49).

Figure 11:
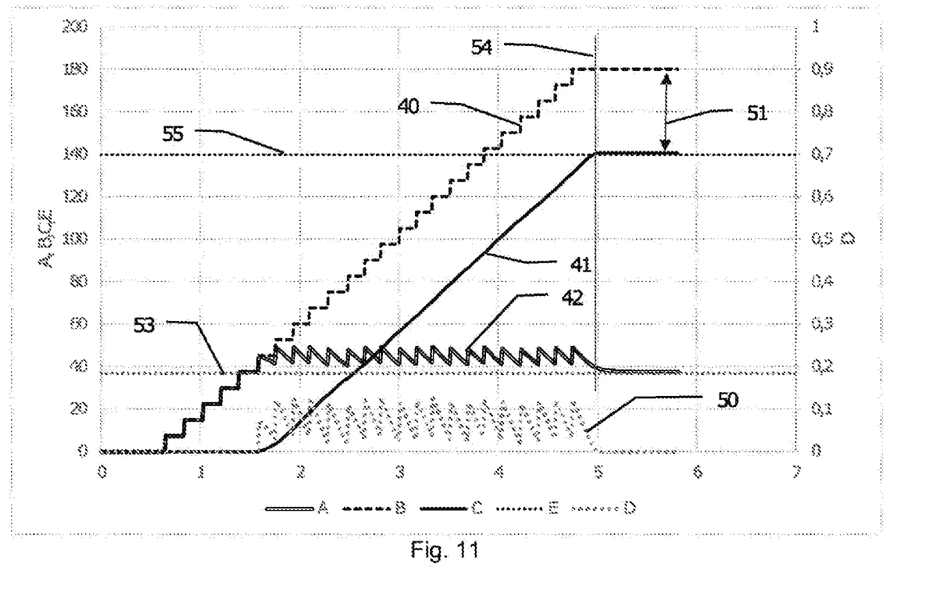
FIG. 11 shows the operation of the method of the present invention illustrated using a graph.

FIG. 11 shows an example of electrical signals calculated by comparing the control signal (40) and the angular values (41) measured by the sensor. This graph shows the variation, as a function of time, in the signals expressed in microsteps (left-hand scale) and in torque (right-hand scale).

Starting from a rest position (initial time), during a movement in a given direction against a constant load, the variation, in microsteps, in the stator position (40) corresponding to the desired movement, the variation, in microsteps, in the measured position of the rotor (41), and the load angle (42) resulting from the difference between the positions (40) and (41), also expressed in microsteps, are plotted in the example provided. As long as the load angle (42) is insufficient to generate a torque greater than the load, no movement is observed at the rotor. As soon as the load angle reaches a threshold that is dependent on friction and load (53), the rotor speed synchronizes with the stator field (40) at a load angle that is approximately constant when the load is constant. At the end of the movement (54), the power supply to the coils is cut off or, so that the stator field vector does not change, the rotor remains in position due to the irreversibility of the mechanical conversion. The load angle (42) remains at its last value before the power supply was stopped. There is a residual offset (51) between the desired position (40) and the actual position of the rotor (41), which offset is equal to the load angle (42), but this is known and can be compensated for by modifying the control (40) by a value equal to the value of this residual offset (51) so that the rotor reaches the desired position (55).

Figure 12:
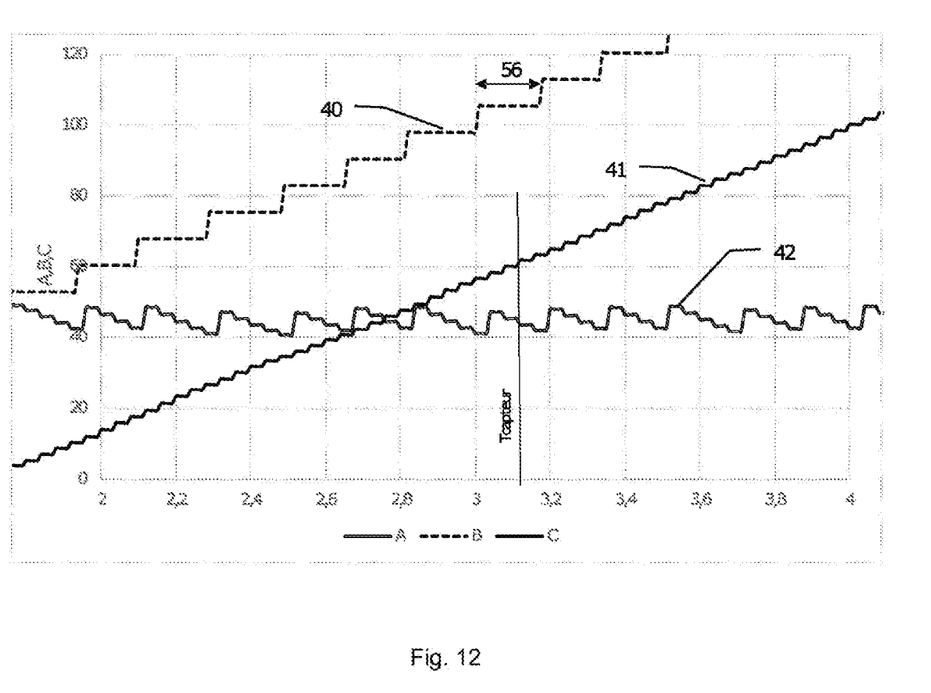
FIG. 12 shows an enlargement of FIG. 11.

FIG. 12 illustrates the phenomenon of discretization induced by the measurement of the sensor at times $T_{capteur}$, with at least four periods in a microstep (56). This graph shows, in degrees, the variation in the signals (40, 41, 42) as a function of time.

Figure 13:
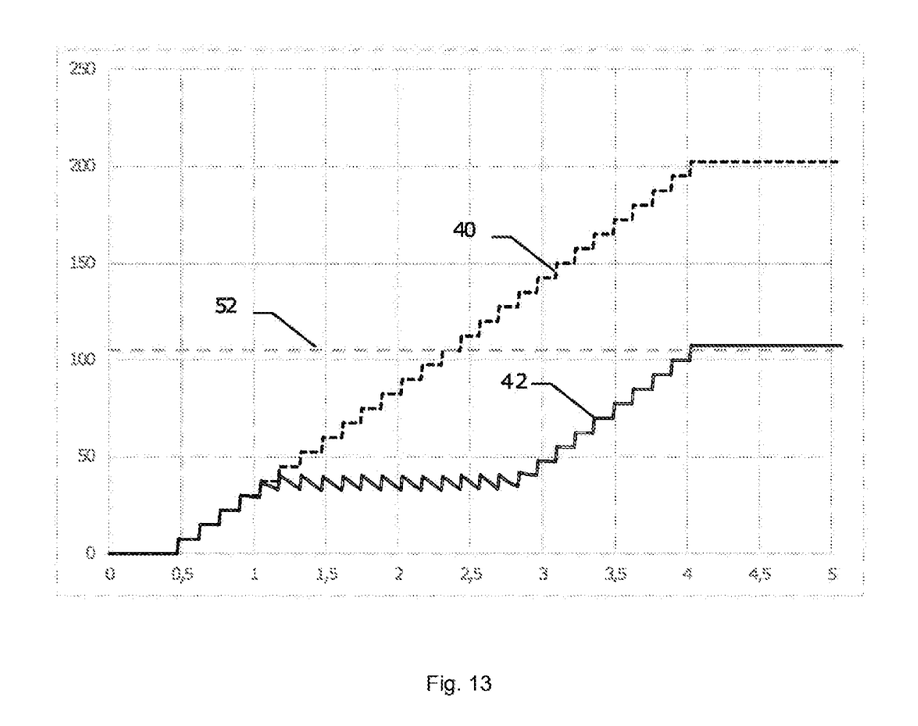
FIG. 13 shows the stop detection method illustrated using a graph.

FIG. 13 illustrates the use of the load angle (42) to detect a mechanical stop when the actuator is moved. This graph shows, in degrees, the variation in the signals and magnitude (40, 42, 52) as a function of time. It is then considered that the rotor has mechanically reached this stop when the load angle (42) exceeds a threshold value (52), for example 100°, given that the maximum allowable current is reached. The precise knowledge of the mechanical stop is therefore possible.

Figure 14:
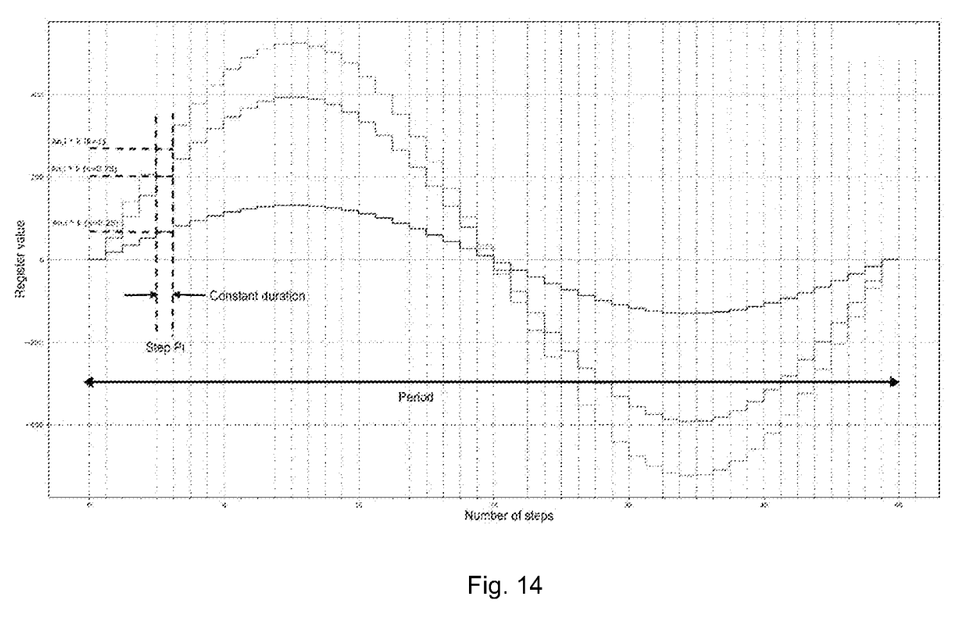
FIG. 14 shows the different voltage values applied to each phase of a motor.

FIG. 14 illustrates the different voltage values applied to each phase of a motor according to the method of the present invention. The number of steps is shown on the X-axis. The Y-axis specifies the voltage value, which is represented as a register value programmed in the microcontroller and which is used to keep the deviations between the mechanical position and the target position constant. All the steps $P_i$ have a step duration and an amplitude $A_{n,i}*k$ determined for each step. The value of the amplitude of each step is different in order to form a sinusoidal periodic function of the control voltage, a period of which is shown here. Depending on the desired harmonic content, the shape of the sine wave can change.

When the deviation between the mechanical position and the target position remains constant, the voltage value follows one of the curves of the periodic function $A_{n,i}*k$ (for example k=0.75). When the deviation between the mechanical position and the target position varies, i.e. increases or decreases, the microcontroller calculates and applies the coefficient k of a higher or lower value of the register in order to adjust the level of voltage applied to the phases of the motor. This results in a higher or lower phase current and therefore a higher or lower torque of the motor in order to adjust to the measured offset. The value of coefficient k can jump from one step to another according to the calculation of the microcontroller, for example from k=0.75 at step P5 to k=0.25 at step P6.

It is important to note that the duration of the steps is determined by the duration of a period of the voltage divided by the total number of steps in a period. When the rotational speed of the motor is fixed, the duration width of each step is constant and identical. When the rotational speed of the motor changes, the step duration width calculated and imposed by the microcontroller varies as a function of the desired movement speed of the motor.

It is also important to note that each voltage value of amplitude $A_{n,i}*k$ is obtained from a constant voltage source by a modulation technique—pulse width modulation (PWM)—by adjusting the duty cycle. The teachings in the field of PWM are well known in the prior art and are not discussed in this text.

Figure 15:
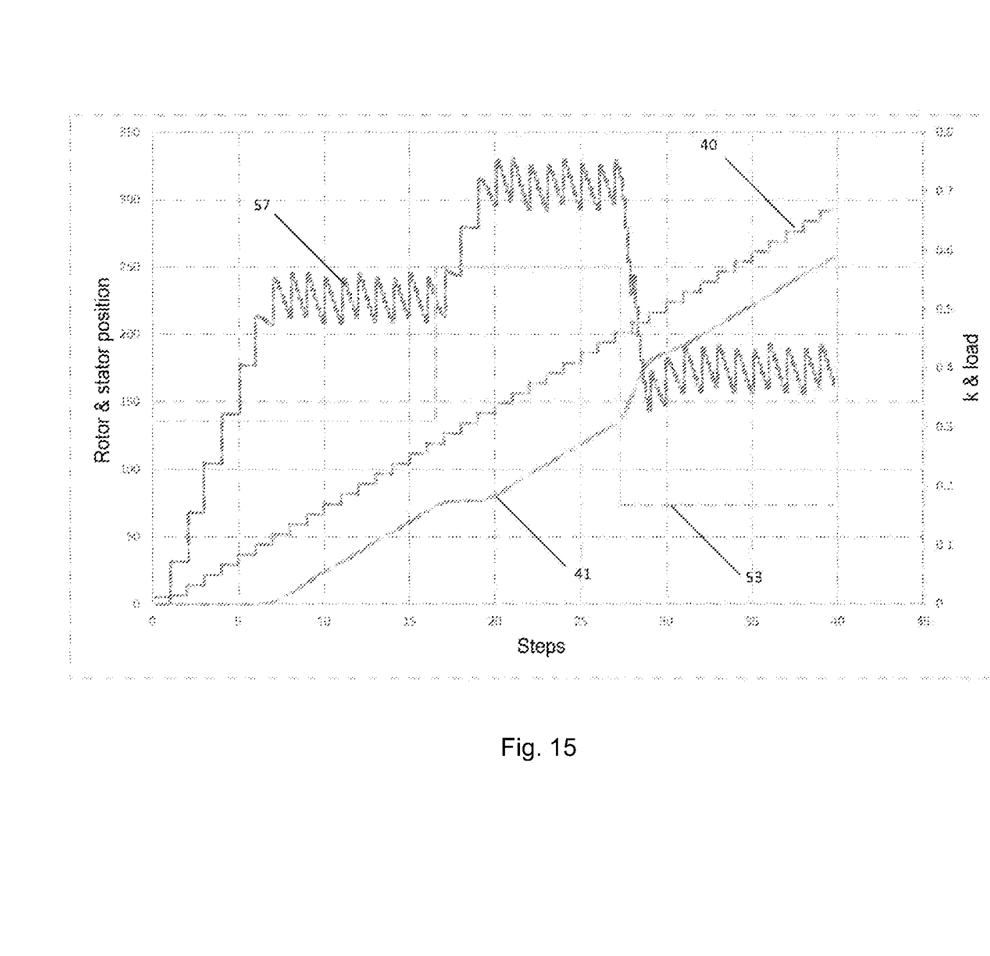
FIG. 15 shows the dynamic modification of the value k as a function of the load applied to the rotor.

FIG. 15 shows the dynamic control modification allowed by the present invention. In the example shown, the variation in the stator position (40) and the variation in the measured position of the rotor (41), at an angle, are plotted on the left-hand ordinate; on the right-hand ordinate, the load value (53) at the rotor and the value of k (57) are plotted on a scale normalized from 0 to 1. The number of steps is shown on the X-axis. The periodic pulses observed are due to the difference in definition between the motor steps and the acquisition of the position of the rotor.

At the initial time, the rotor is stopped and the stator position (40) is at zero, as is the value of k (57). From this rest position (initial time), a constant load (53) of approximately 0.3 (normalized value) is applied. Due to inertia and mechanical clearance, the rotor remains in the zero position. As the command is given to the motor to move forward, the stator position (40) increases. As long as the load angle resulting from the difference between the stator position (40) and the rotor position (41) is insufficient to generate a torque greater than the load, no movement is observed at the rotor. This results in an increase in the load angle and therefore in the value of k (57) from step P0 to step P7.

As soon as the load angle reaches a threshold dependent on friction and load, the speed of the rotor synchronizes with the stator field (40) at a load angle that is approximately constant when the load is constant. The value of k remains around a value of 0.5 (normalized value) from step P7 to step P16. After step P16, the load has increased from approximately 0.3 to 0.55 (normalized value). Thus, the load angle increases until a new value is reached, which corresponds to an average value of k of 0.7. This value remains almost constant up to step P27. From step P27 to step P40, the load has decreased from approximately 0.55 to 0.17. As a result, the load angle decreases, which leads to a decrease in k to an average value of 0.4.

FIG. 15 shows how the command dynamically modifies the value of k (and therefore the value of the average current flowing in the motor) as a function of the load which is applied to the rotor by the intrinsic relationship between the load angle and the value of k. The function example of FIG. 15 is in no way limiting but only given by way of example of dynamic operation. Throughout this sequence, the speed of the control defined by the duration of the voltage step is always constant, only the value of k and therefore the amplitude of the voltage step and therefore the amplitude of the current to the coils of the motor varying as a function of the load to the rotor.

Minimization of Electricity Consumption

The invention also relates to a method for controlling a polyphase actuator according to the main claim, the method making it possible to reduce the current consumption according to the following different steps:
  dynamically correcting the load angle according to the general teachings described in the application until the load angle is less than a first fixed threshold, typically 5°;
  putting the microcontroller on standby and stopping the electrical power supply to the motor phases, the microcontroller consuming only minimal energy while awaiting a wake-up order and while continuing to measure the load angle;
  waking up the microcontroller as soon as the load angle exceeds a second fixed threshold, typically 80°, then supplying power to the phases of the motor in order to reduce the load angle until the first fixed threshold is reached.

Dynamic Estimation of the Mechanical Clearance

The invention also relates to a method for controlling a polyphase actuator according to the main claim, the method making it possible to learn, continuously or as desired, the mechanical clearance present in the actuator (by the possible existence of a mechanical reduction gear inserted between the rotor of the actuator and the movable output member) and having the following steps:
  driving the movable member in a first movement direction along a plurality of steps $P_i$;
  stopping the movement and driving the movable member in a second movement direction;
  measuring the load angle and determining a maximum value;
  determining a mechanical clearance such that the mechanical clearance is equal to the previously measured maximum value of the load angle;
  correcting the load angle according to the teachings described in the application, said correction taking into account the previously determined mechanical clearance.

Predictive Maintenance

The invention also relates to a method for controlling a polyphase actuator according to the main claim, the method making it possible to predict a need for maintenance and having the following steps:
  software-defining a mechanical clearance threshold value above which the actuator is considered damaged or worn;
  regular learning during the life of the vehicle of the mechanical clearance as described above;
  when the measured mechanical clearance has reached or is greater than the defined mechanical clearance threshold value, sending information to the external control unit of the actuator.

Dynamic Adjustment of the Docking Speed

The invention also relates to a method for controlling a polyphase actuator according to the main claim, the method making it possible to produce a speed curve that is adjusted to reach a mechanical stroke end (or stop) at a reduced speed and having the following steps:
  defining a speed curve as a function of the position of the movable member within its stroke;
  regular learning during the life of the vehicle of the mechanical clearance as described above;
  taking into account said mechanical clearance in the speed curve of the position as a function of the movable member in order to ensure a constant docking speed at one end of the actuator stroke.

The invention claimed is:

1. A method for controlling a polyphase actuator, the method comprising:
  supplying each phase with a periodically varying supply voltage having a periodic sequence of steps $P_i$ that have a constant duration and an amplitude $A_{n,i}$, where n corresponds to a rank of the phase and i to a rank of a step $P_i$ determining a target position $PC_i$ of a movable member of the actuator, in order to define a sinusoidal voltage envelope;
  the actuator further comprising a stator equipped with electrical coils and a sensor detecting a mechanical position of the movable member with respect to the stator;
  a microcontroller determining, at times $T_{capteur}$, the mechanical position of the movable member;

the microcontroller calculating, at each of the times $T_{capteur}$, a difference between the mechanical position and the target position $PC_i$ corresponding to the step $P_i$, and the microcontroller calculating a coefficient k as a function of the difference; and the microcontroller weighting the amplitude of a power supply applied to the phases by the coefficient k in order to supply the phases with weighted amplitude voltages $A_{n,i}*k$.

2. The method for controlling a polyphase actuator according to claim 1, comprising at least one acquisition time $T_{capteur}$ of the mechanical position of the movable member for a step $P_i$.

3. The method for controlling a polyphase actuator according to claim 1, comprising at least four acquisition times $T_{capteur}$ of the mechanical position of the movable member for a step $P_i$.

4. The method for controlling a polyphase actuator according to claim 1, wherein the coefficient k is proportional to the difference between the mechanical position and the target position $PC_i$ corresponding to the step $P_i$.

5. The method for controlling a polyphase actuator according to claim 1, wherein the movable member is a rotor.

6. The method for controlling a polyphase actuator according to claim 1, wherein the movable member is moved by a movement conversion member.

7. The method for controlling a polyphase actuator according to claim 5, wherein the rotor is movable through a plurality of turns.

8. The method for controlling a polyphase actuator according to claim 7, wherein the rotor is movable through the plurality of turns in a helical movement and the rank of the turn, relative to an initial position, is determined by a norm of a signal delivered by a two-dimensional magnetic sensor.

9. The method for controlling a polyphase actuator according to claim 1, wherein locking of the movable member or of a rotor is determined by the coefficient k reaching a threshold value $k_{seuil}$.

10. The method for controlling a polyphase actuator according to claim 1, comprising a calibration step involving controlling movement of the movable member as far as a mechanical stop, and detecting locking by the coefficient k reaching a threshold value $k_{seuil}$, and recording, in a memory, the step $P_i$ corresponding to this threshold value being reached as a reference $P_0$ of the movable member.

11. The method for controlling a polyphase actuator according to claim 1, comprising a step of holding the movable member in an inoperative position, involving periodically measuring the coefficient k, and controlling the amplitude of the supply voltage of the phases if the coefficient k exceeds a threshold value.

12. The method for controlling a polyphase actuator according to claim 1, comprising modifying an electrical phase control to move a measured position of the movable member closer to a desired mechanical position.

13. The method for controlling a polyphase actuator according to claim 8, wherein the rank of the turn is compared with a previously recorded value.

14. A fluid control valve comprising:

a movable rotor;

a stator equipped with electrical coils;

a sensor configured to detect a mechanical position of the rotor with respect to the stator;

each phase being supplied with a periodically varying voltage having a periodic sequence of steps that have a constant duration and an amplitude $A_{n,i}$, where n corresponds to a rank of the phase and i to a rank of a step $P_i$ determining a target position $PC_i$ of the rotor, in order to define a sinusoidal voltage envelope;

a microcontroller configured to determine the mechanical position of the movable member;

the microcontroller being configured to calculate, at each of the times a difference between the mechanical position and the target position, and the microcontroller being configured to calculate a coefficient k as a function of the difference; and the microcontroller being configured to weight the amplitude of power applied to the phases by the coefficient k in order to supply the phases with weighted amplitude voltages $A_{n,i}*k$.

* * * * *